(12) United States Patent  
Farmer

(10) Patent No.: US 11,192,021 B1
(45) Date of Patent: Dec. 7, 2021

(54) CHESS GAME WITH POSITION-TRIGGERED CONSEQUENCE CARDS

(71) Applicant: David Farmer, Marietta, GA (US)

(72) Inventor: David Farmer, Marietta, GA (US)

( * ) Notice: Subject to any disclaimer, the term of this patent is extended or adjusted under 35 U.S.C. 154(b) by 0 days.

(21) Appl. No.: 17/225,848

(22) Filed: Apr. 8, 2021

(51) Int. Cl.
*A63F 3/02* (2006.01)
*G09B 19/22* (2006.01)

(52) U.S. Cl.
CPC .............. *A63F 3/022* (2013.01); *G09B 19/22* (2013.01); *A63F 2003/025* (2013.01)

(58) Field of Classification Search
CPC .... A63F 3/012; A63F 2003/025; G09B 19/22
See application file for complete search history.

(56) References Cited

U.S. PATENT DOCUMENTS 10,926,163 B1   2/2021   Suber, III et al.

FOREIGN PATENT DOCUMENTS

CN   203342334 U   * 12/2013

OTHER PUBLICATIONS

Jayson Bartels, ILLUSTRATOR: Battle Chess, May 1, 2020, available at <<https://jaysonbartels.wordpress.com/2020/05/01/illustrator-battle-chess/>> (Year: 2020).*
Battle Chess II: Chinese Chess, 1990, Interplay Productions. (Year: 1990).*
CNN; Article entitled: "'The Queen's Gambit' is sparking a surge of interest in chess", located at <https://www.cnn.com/2020/12/06/us/queens-gambit-chess-popularity-trnd/index.html>, published Dec. 6, 2020, 9 pgs.
Stack Exchange; Article entitled: "Memorizing the board", located at https://chess.stackexchange.com/questions/329/memorizing-the-board>, published May 9, 2012, 4 pgs.

* cited by examiner

*Primary Examiner* — Werner G Garner
(74) *Attorney, Agent, or Firm* — Taylor English Duma LLP

(57) ABSTRACT

A chess game kit includes a chessboard defining opposed edges, a lateral axis of symmetry bisecting the chessboard, and a top surface extending between the opposed edges. The top surface defines a plurality of chessboard squares defining a plurality of ranks. The ranks adjacent to the lateral axis of symmetry define two central ranks that together comprise a battle zone. Chessboard squares located outside of the battle zone alternate between a first color and a second color, and chessboard squares located within the battle zone alternate between the first color and a third color. The kit further includes a plurality of cards each reciting a chess game consequence to occur as a result of a player moving a capturing chess piece from a first chessboard position outside of the battle zone to a second chessboard position inside the battle zone to capture an opposing chess piece.

12 Claims, 4 Drawing Sheets

CHESS GAME WITH POSITION-TRIGGERED CONSEQUENCE CARDS

TECHNICAL FIELD

This disclosure relates to games. More specifically, this disclosure relates to board games, namely, chess games.

BACKGROUND

The game of chess is the quintessential game of strategy, played worldwide. In the words of a December 2020 article posted at CNN.com: "The game dates back more than a thousand years and is revered for the way its seemingly simple elements—32 pieces on a 64-square chessboard—can produce infinite strategies of attack and defense," and it "rewards players who can visualize the board in creative ways and see several moves ahead."

Move strategies, such as those for opening moves, have become standardized to the point of associating different names for known particular sequences of moves, such as "King's Gambit" and "Queen's Gambit" for white pieces and "Sicilian Defense," "French Defense," and "the Slav" for black pieces, as described in "the chesswebsite.com."

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In an aspect of the present disclosure, a chess game kit configured to be used with a set of chess pieces comprises a chessboard configured to accommodate all chess pieces in the set of chess pieces. The chessboard defines a first longitudinal edge, a second longitudinal edge spaced from the first longitudinal edge, a lateral axis of symmetry bisecting the chessboard into two lateral halves, and a top surface extending between the first longitudinal edge and the second longitudinal edge, the top surface defining a plurality of chessboard squares. The plurality of chessboard squares defines a plurality of ranks, each rank extending as a single row of chessboard squares from the first longitudinal edge to the second longitudinal edge. Ranks adjacent to the lateral axis of symmetry define two central ranks that together comprise a battle zone. Chessboard squares in the plurality of chessboard squares located outside of the battle zone alternate between a first color and a second color different from the first color, and chessboard squares in the plurality of chessboard squares located within the battle zone alternate between the first color and a third color different from both the first color and the second color. The chess game kit further comprises a plurality of cards, the plurality of cards comprising cards that each recite a chess game consequence to occur as a result of a player moving a capturing chess piece from a first chessboard position outside of the battle zone to a second chessboard position inside the battle zone to capture an opposing chess piece.

In another aspect of the present disclosure, a method of playing a chess game comprises the steps of placing a plurality of chess pieces on a chessboard, wherein the chessboard defines a first longitudinal edge, a second longitudinal edge spaced from the first longitudinal edge, a lateral axis of symmetry bisecting the chessboard into two lateral halves, and a top surface extending between the first longitudinal edge and the second longitudinal edge, the top surface defining a plurality of chessboard squares, wherein the plurality of chessboard squares defines a plurality of ranks, each rank extending as a single row of chessboard squares from the first longitudinal edge to the second longitudinal edge, wherein ranks adjacent to the lateral axis of symmetry define two central ranks that together comprise a battle zone, wherein chessboard squares in the plurality of chessboard squares located outside of the battle zone alternate between a first color and a second color different from the first color, and wherein chessboard squares in the plurality of chessboard squares located within the battle zone alternate between the first color and a third color different from both the first color and the second color; moving a capturing chess piece from a first chessboard position located outside the battle zone to a second chessboard position located inside the battle zone to capture an opposing chess piece; drawing a card from a plurality of cards, the plurality of cards comprising cards that each recite a chess game consequence; and proceeding with the chess game in accordance with one or more instructions recited on the card drawn from the plurality of cards.

Various implementations described in the present disclosure can comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations can be realized and obtained by means of the systems, methods, features particularly pointed out in the appended claims. These and other features will become more fully apparent from the following description and appended claims, or can be learned by the practice of such exemplary implementations as set forth hereinafter.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
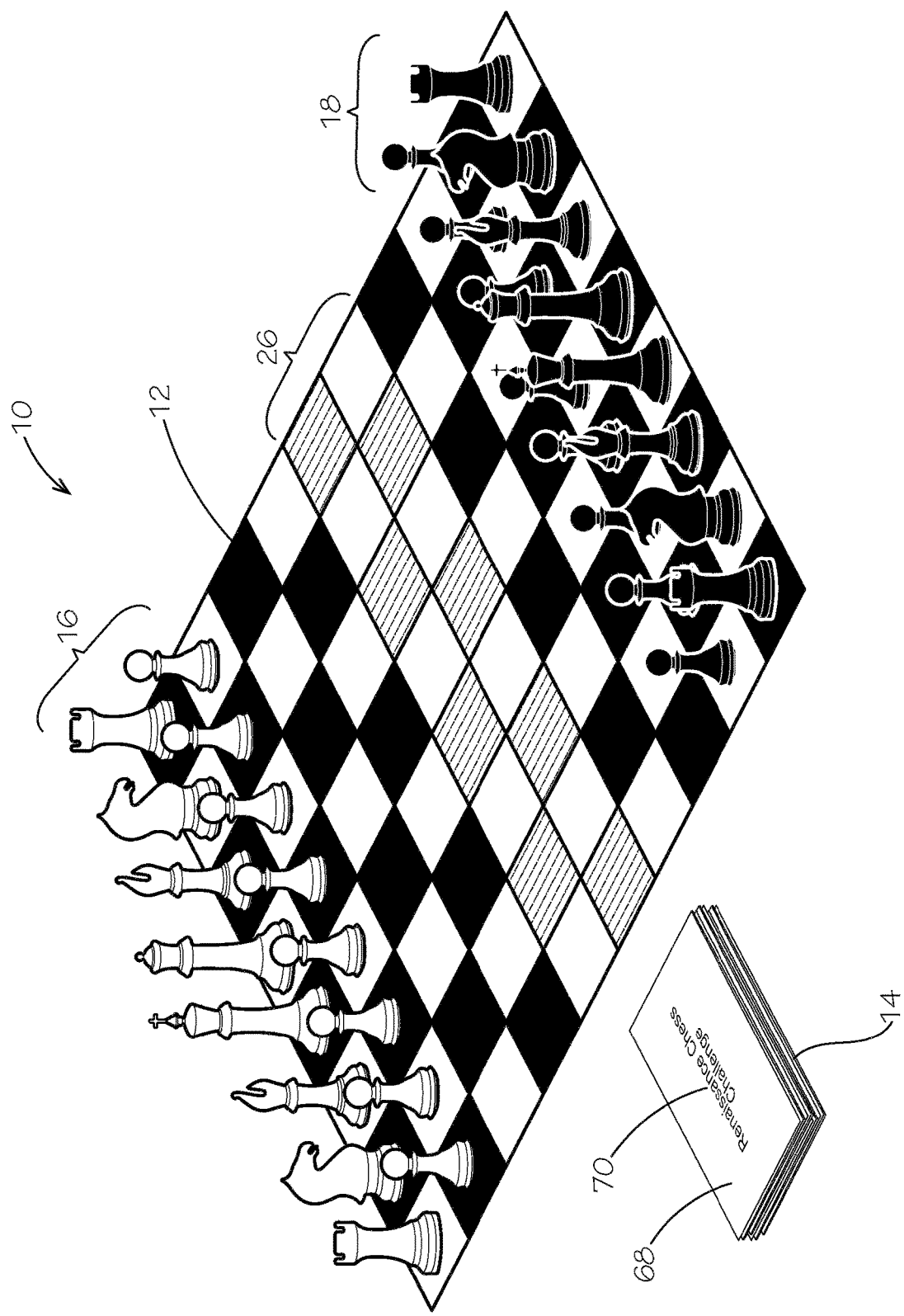
FIG. 1 is a perspective view of a chess game set constructed in accordance with an aspect of the present disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "top," "bottom," "side," "upper," "lower," "horizontal," and/or "vertical" may be referenced. Unless stated otherwise, "top" describes that side of the system or component that is facing upward and "bottom" is that side of the system or component that is opposite or distal the top of the system or component and is facing downward. Unless stated otherwise, "side" describes that an end or direction of the system or component facing in horizontal direction. "Horizontal" or "horizontal orientation" describes that which is in a plane aligned with the horizon. "Vertical" or "vertical orientation" describes that which is in a plane that is angled at 90 degrees to the horizontal.

Disclosed are a modified chess game set and chess game playing method that introduce an element of chance into a game closely associated with strategic skill. This chance element makes the game less predictable, because sudden changes can occur that cannot be anticipated at the outset of a chess game or at any point during play. This unpredictability requires the players to adjust their strategies as the game progresses. These and other benefits are attendant to the chess game set and playing method disclosed herein.

FIG. 1 illustrates a chess game set 10 comprising a modified chessboard 12, a deck 14 of chess game consequence cards (described in greater detail with regard to FIG. 4), conventional white chess pieces 16, and conventional black chess pieces 18. In one commercial form, a kit can be sold that comprises only the modified chessboard 12 and the deck 14 of chess game consequence cards, allowing customers already owning chess sets to play the game herein disclosed with their existing chess pieces. In another form, the entire game set 10 can be sold so as to include the chess pieces (also known as "material") 16, 18. Chessboard 12 is shown to be a modified version of a conventional chessboard 20 (FIG. 2) by the addition of a central "battle zone" 26, to be described in greater detail with regard to FIG. 3. Chessboard 12 can be constructed of any suitably-durable material and need not even be constructed from a rigid material. It may comprise a roll of flexible material that can be unfurled when players are ready to play a game using the chess game set 10. For example, chessboard 12 may be constructed of a thin polymeric layer, which would include the top surface 36 (FIG. 3), superposed and glued or fused onto a ¾-inch thick substrate (base) of foam rubber.

Figure 2:
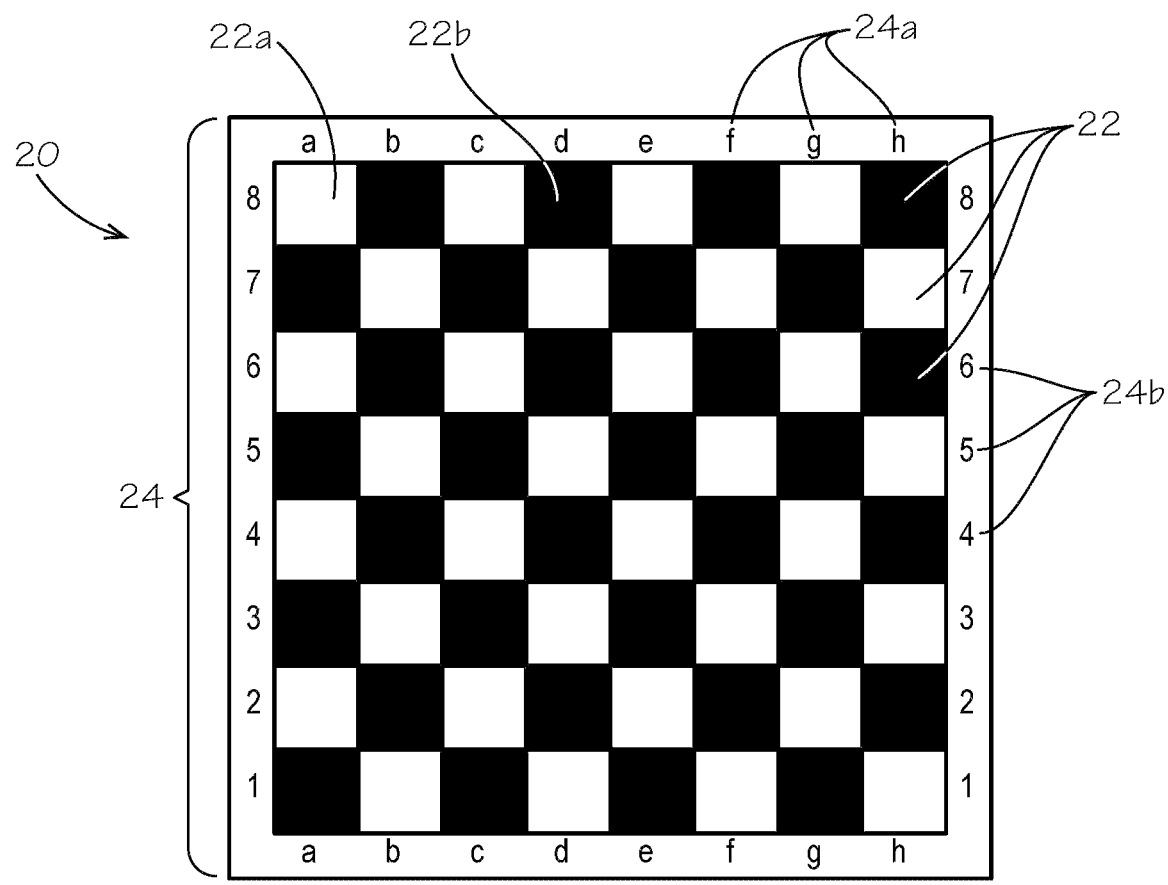
FIG. 2 is a top view of a conventional chessboard annotated with familiar algebraic notation.
Figure 3:
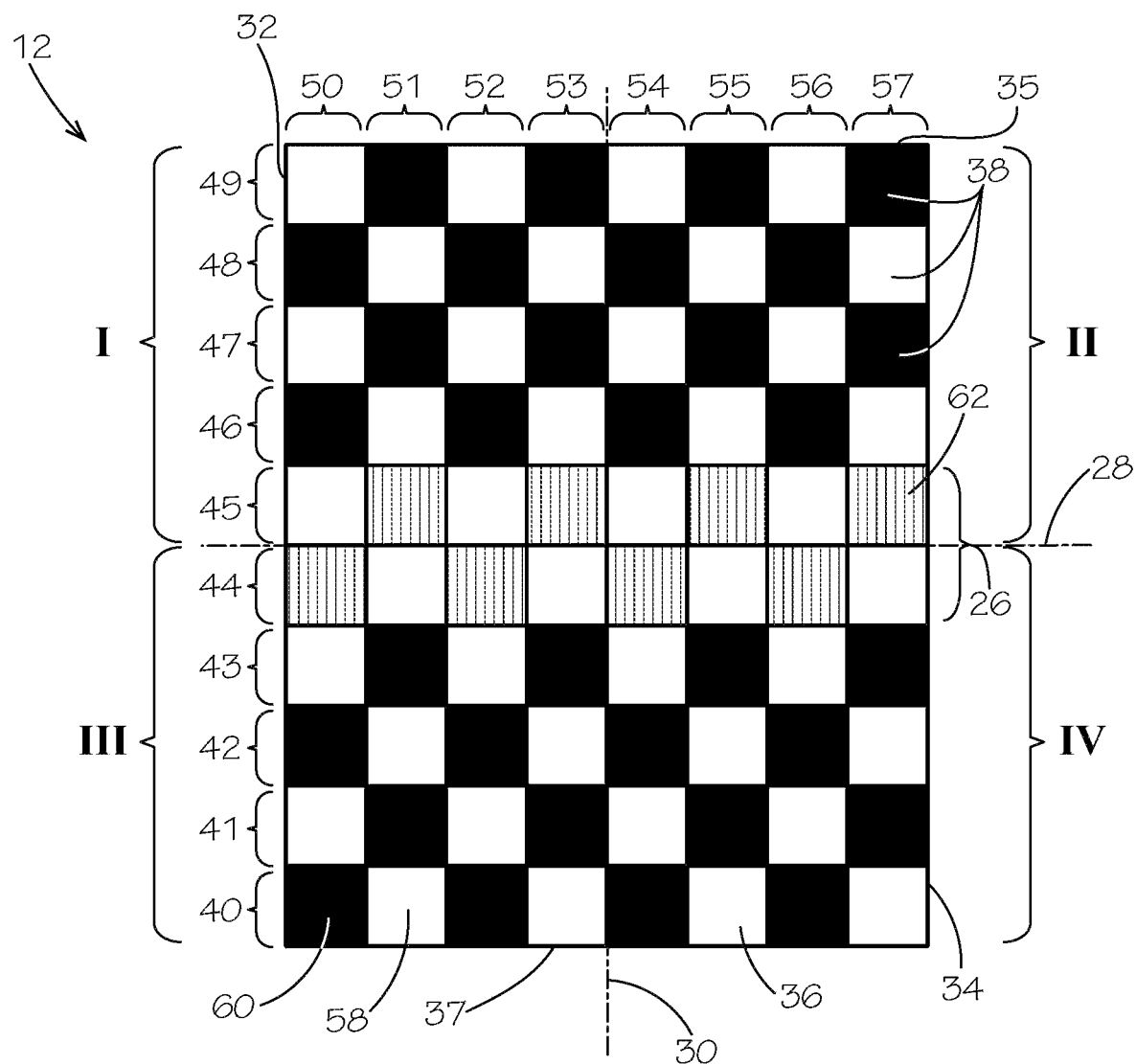
FIG. 3 is a top view of a modified chessboard in the chess game set illustrated in FIG.

A brief discussion of an exemplary conventional chessboard 20, shown in its top view in FIG. 2, provides context for then describing the modification of FIG. 3. Conventional chessboard 20 defines sixty-four chessboard squares 22 arranged in an 8×8 grid (i.e., eight columns and eight rows). FIG. 2 shows the chessboard 20 in relation to algebraic notation (indicia) 24 familiar to chess players, the algebraic notation 24 providing a unique identification of each chessboard square 22; for example, the chessboard square 22 at the lower, right-hand corner the chessboard 20 is named "h1" according to the algebraic notation 24. Such identification allows one to accurately record each move made during a chess game. The letters 24a of the algebraic notation 24 identify "files," or columns, of chessboard squares 22 on the chessboard 20. The numerals 24b of the algebraic notation 24 identify the "ranks," or rows, of chessboard squares 22 on the chessboard 20. Adjacent chessboard squares 22 conventionally alternate colors, between a first color 22a (shown as white in FIG. 2) and a second color 22b (shown as black in FIG. 2) differing from the first color 22a.

FIG. 3 is a top view of the modified chessboard 12 for the chess game set 10 illustrated in FIG. 1. The nature of the modification of chessboard 12 is to provide a "battle zone" 26, comprising the two central ranks (rows) of the chessboard 12 that exhibit a color scheme differing from that exhibited by the remaining ranks of the chessboard 12. The embodiment illustrated in FIG. 3 adds two ranks of chessboard squares 38 to provide the battle zone 26, such that for this embodiment, the top surface 36 of chessboard 12 defines a 10×8 grid of chessboard squares 38 instead of the conventional 8×8 grid of FIG. 2. If chessboard 12 is conventionally-sized to likewise define sixty-four chessboard squares, then central ranks of chessboard 12 respectively correspond to ranks 4 and 5 on the conventional chessboard 20 (FIG. 2).

The term "central" can be more universally defined in the context of the following description of the geometry of the chessboard 12. FIG. 3 shows chessboard 12 defining axes of symmetry 28,30 that divide the chessboard 12 into four equally-sized imaginary quadrants I, II, III, and IV. Each quadrant is rectangular but, as exemplified by FIG. 3, each quadrant need not form a square. Whether a quadrant forms a square depends on the grid dimensions of the chessboard 12. The lateral axis of symmetry 28 bisects the chessboard 12 into two lateral halves, one lateral half comprising quadrants I and II, and the other lateral half comprising quadrants III and IV. The longitudinal axis of symmetry 30 bisects the chessboard 12 into two longitudinal halves, one longitudinal half comprising quadrants I and III, and the other longitudinal half comprising quadrants II and IV. Chessboard 12 further defines a first longitudinal edge 32, a second longitudinal edge 34 spaced from the first longitudinal edge 32, a first lateral edge 35, a second lateral edge 37 spaced from the first lateral edge 35, and a top surface 36 extending between the first longitudinal edge 32 and the second longitudinal edge 34, as well as between the first lateral edge 35 and the second lateral edge 37, the top surface 36 defining a plurality of chessboard squares 38. The plurality of chessboard squares 38 defines a plurality of ranks 40-49, each rank 40-49 extending as a single row of chessboard squares 38 from the first longitudinal edge 32 to the second longitudinal edge. Ranks 44,45 are adjacent to the lateral axis of symmetry 28, in that one edge of each chessboard square 38 in ranks 44,45 is collinear with the lateral axis of symmetry 28. Ranks 44,45 thereby define the two central ranks of chessboard 12 that together comprise the battle zone 26.

Chessboard squares 38 located outside of the battle zone 26 alternate between a first color 58 and a second color 60 different from, and preferably darker than, the first color 58, as is the case with conventional chessboards. For example, the first color 58 may be white and the second color 60 may be black; as another example, the first color 58 may be tan and the second color 60 may be brown. Many variations on such color relationships are possible. The chessboard squares 38 located within the battle zone 26 alternate between the first color 58 and a third color 62 different from both the first color 58 and the second color 60. The cross-hatching in FIG. 3 indicates that the third color 62 is red. However, third color 62 can be any other color that visibly distinguishes chessboard squares 48 inside the battle zone 26 from the rest of the chessboard squares 48 on the chessboard 12.

FIG. 3 also illustrates the plurality of chessboard squares 38 defining a plurality of files (columns) 50-57, of which files 53,54 are adjacent to the longitudinal axis of symmetry 30, in that one edge of each chessboard square 38 in files 53,54 is collinear with the longitudinal axis of symmetry 28. Four of the plurality of chessboard squares 38 are adjacent to both the lateral axis of symmetry 28 and the longitudinal axis of symmetry 30, thereby defining four central squares that, for a standard 8×8 chessboard, respectively correspond to chessboard squares d5, e5, d4, and e4 of the conventional chessboard 20 (FIG. 2). In the exemplary chessboard 12 of FIGS. 1 and 3, the four central chessboard squares have the following coordinate (file, rank) positions: (53,45); (54,45); (53,44); and (54,44). These four central squares are mentioned in at least one of the consequence cards in the card deck 14 (FIG. 1), as described below in greater detail with regard to FIG. 4.

Figure 4:
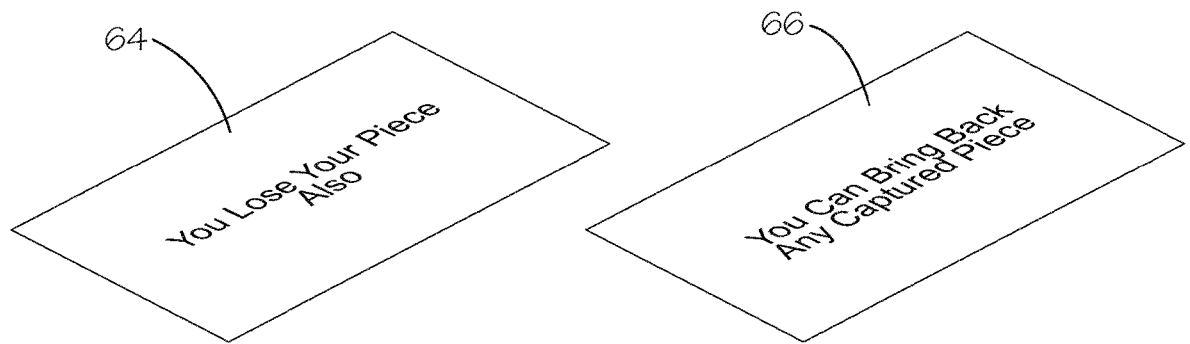
FIG. 4 is a perspective view of bottom faces of two exemplary consequence cards from the card deck shown in FIG. 1, reciting different chess game consequences.

FIG. 4 is a perspective view of bottom faces of two exemplary consequence cards 64,66 from the card deck 14 shown in FIG. 1, each reciting different chess game consequences. The top face 68 (FIG. 1) of each card in the deck 14 may each display the same insignia 70, such as a design or a trademark for a commercial embodiment of the chess set 10 or of the above-mentioned kit. According to a rule of a chess game played with set 10, a player must draw the top card in the deck 14 whenever the player moves a capturing chess piece from a first chessboard position located outside the battle zone 26 to a second chessboard position located inside the battle zone 26 to capture an opposing chess piece. The bottom face of card 64 is shown to recite a consequence reading "You Lose Your Piece Also," and the bottom face of card 66 is shown to recite a different consequence reading: "You Can Bring Back Any Captured Piece." These are two exemplary expressions of consequences included in the following list of possible consequences: (i) loss of the capturing chess piece, (ii) a retreat of the capturing chess piece back to the first chessboard position, (iii) restoration of the opposing chess piece to the second chessboard position, (iv) loss of a chess piece located in a rear rank (i.e., one of rank 40 and rank 54 on the chessboard 12), (v) granting one player another move consecutively following capture of the opposing chess piece, and (vi) granting another player two consecutive moves, (vii) restoration of a previously-captured chess piece, effected by placing a restored chess piece on one of the four central chessboard squares, (viii) restoration of a previously-captured chess piece, except for any captured queen, effected by placing a restored chess piece on one of the four central chessboard squares, and (ix) in combination with either (vii) or (viii), a grant of immunity for the restored chess piece for a predetermined number of ensuing moves by the another player.

The deck of cards 14 need not include only consequence cards such as those exemplified at 64,66. The deck 14 can also include cards stating that no consequence results from a capture of the opposing chess piece within the battle zone 26. The bottom faces of the cards in the deck 14 can therefore recite the following expressions to describe consequences, as well as the lack of any consequence:

You Lose Your Piece Also

Retreat Back After Capture

You Get One Free Move Now

You Win the Move But Your Opponent Gets an Extra Move

"Nothing Happens" [More than one card reciting this may be included in the deck 14.]

You Can Bring Back Any Captured Piece—The piece goes in one of the 4 center spaces and is safe for 2 moves. This card may be held until used.

You lose a piece on your back line that has not been moved yet.—You Pick.—If all of your pieces have been moved this card is invalid.

You Move again

Your Piece Dies—Put Your Opponent Back.

You have 3 moves to free any piece. Your piece has to be put in one of the four center squares and is safe for 2 moves.

You Can Bring Back Any Captured Piece, Except the Queen—The piece goes in one of the 4 center spaces and is safe for 2 moves. This card may be held until used.

Go Back to where you were, lose your turn, replace the piece you just captured.

Another aspect of the present disclosure contemplates a method of playing a chess game using the chess game set 10 (FIG. 1). Such a method can include placing a plurality of chess pieces on the chessboard 12, moving a capturing chess piece from a first chessboard position located outside the battle zone 26 to a second chessboard position located inside the battle zone 26 to capture an opposing chess piece, drawing a card from a plurality of cards in the card deck 14, and proceeding with the chess game in accordance with one or more instructions recited on the card drawn from the plurality of cards. The instructions correspond to both the consequences discussed above and the above-discussed cards indicating that no consequence ensues from the capture of the opposing piece in the battle zone 26.

The present disclosure contemplates several modifications concerning the disclosed chess game. For example, the consequences listed above with regard to the discussion of FIG. 4 need not be expressed exactly as quoted above. The same consequences can be expressed in alternative terms, such as using more fanciful language. For further example, the chessboard squares 38 inside the battle zone 26 need not alternate between the first color 58 and the third color 62. Instead, the battle zone chessboard squares can alternate between the third color 62 and a fourth color different from the other colors; for example, they could be alternating colors of red and pink, or of royal blue and light blue, instead of red and white. In a still further modification, the top surface 36 of the chessboard 12 need not define the 10×8 grid of chessboard squares 38 depicted in FIGS. 1 and 3; instead, the top surface 36 could define a conventional 8×8 grid or even other non-conventional grid dimensions.

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

That which is claimed is:

1. A chess game kit configured to be used with a set of chess pieces, comprising:
    a chessboard configured to accommodate all chess pieces in the set of chess pieces, the chessboard defining a first longitudinal edge, a second longitudinal edge spaced from the first longitudinal edge, a lateral axis of symmetry bisecting the chessboard into two lateral halves, and a top surface extending between the first longitudinal edge and the second longitudinal edge, the top surface defining a plurality of chessboard squares,
        wherein the plurality of chessboard squares defines a plurality of ranks, each rank extending as a single row of chessboard squares from the first longitudinal edge to the second longitudinal edge,
        wherein ranks adjacent to the lateral axis of symmetry define two central ranks that together comprise a battle zone,
        wherein chessboard squares in the plurality of chessboard squares located outside of the battle zone alternate between a first color and a second color different from the first color, and
        wherein chessboard squares in the plurality of chessboard squares located within the battle zone alternate between the first color and a third color different from both the first color and the second color; and
    a plurality of cards, the plurality of cards comprising cards that each recite a chess game consequence to occur as a result of a player moving a capturing chess piece from a first chessboard position outside of the battle zone to a second chessboard position inside the battle zone to capture an opposing chess piece.

2. The chess game kit of claim 1, wherein the top surface defines a 10×8 grid of chessboard squares.

3. The chess game kit of claim 1, wherein the plurality of cards further comprises at least one card stating that no consequence results from a capture of the opposing chess piece within the battle zone.

4. The chess game kit of claim 1, wherein the third color is red.

5. The chess game kit of claim 1, wherein the player is a first player, and wherein the chess game consequence comprises at least one of (i) loss of the capturing chess piece, (ii) a retreat of the capturing chess piece to the first chessboard position, (iii) restoration of the opposing chess piece to the second chessboard position, (iv) loss of a chess piece of the first player located in a rear rank on the chessboard, (v) granting the first player another move consecutively following capture of the opposing chess piece, and (vi) granting a second player two consecutive moves.

6. The chess game kit of claim 5,
    wherein the chessboard further defines a longitudinal axis of symmetry bisecting the chessboard into two longitudinal halves,
    wherein chessboard squares in the plurality of chessboard squares adjacent to both the lateral axis of symmetry and the longitudinal axis of symmetry define four central chessboard squares within the battle zone, and
    wherein the chess game consequence further comprises at least one of (vii) restoration of any previously-captured chess piece of the first player, effected by placing a first restored chess piece on one of the four central chessboard squares, (viii) restoration of any previously-captured chess piece of the first player, except for any captured queen, effected by placing a second restored chess piece on one of the four central chessboard squares, and (ix) a grant of immunity for any restored chess piece for a predetermined number of ensuing moves by the second player.

7. A method of playing a chess game, comprising the steps of:
    placing a plurality of chess pieces on a chessboard, wherein the chessboard defines a first longitudinal edge, a second longitudinal edge spaced from the first longitudinal edge, a lateral axis of symmetry bisecting the chessboard into two lateral halves, and a top surface extending between the first longitudinal edge and the second longitudinal edge, the top surface defining a plurality of chessboard squares,
        wherein the plurality of chessboard squares defines a plurality of ranks, each rank extending as a single row of chessboard squares from the first longitudinal edge to the second longitudinal edge,
        wherein ranks adjacent to the lateral axis of symmetry define two central ranks that together comprise a battle zone,
        wherein chessboard squares in the plurality of chessboard squares located outside of the battle zone alternate between a first color and a second color different from the first color, and wherein chessboard squares in the plurality of chessboard squares located within the battle zone alternate between the first color and a third color different from both the first color and the second color;

moving a capturing chess piece from a first chessboard position located outside the battle zone to a second chessboard position located inside the battle zone to capture an opposing chess piece;

drawing a card from a plurality of cards, the plurality of cards comprising cards that each recite a chess game consequence; and proceeding with the chess game in accordance with one or more instructions recited on the card drawn from the plurality of cards.

8. The method of claim 7, wherein the top surface defines a 10×8 grid of chessboard squares.

9. The method of claim 7, wherein the plurality of cards further comprises at least one card stating that no consequence results from a capture of the opposing chess piece within the battle zone.

10. The method of claim 7, wherein the third color is red.

11. The method of claim 7, wherein the chess game consequence comprises at least one of (i) loss of the capturing chess piece, (ii) a retreat of the capturing chess piece back to the first chessboard position, (iii) restoration of the opposing chess piece to the second chessboard position, (iv) loss of a chess piece located in a rear rank on the chessboard, (v) granting one player another move consecutively following capture of the opposing chess piece, and (vi) granting another player two consecutive moves.

12. The method of claim 11, wherein the chessboard further defines a longitudinal axis of symmetry bisecting the chessboard into two longitudinal halves, wherein chessboard squares in the plurality of chessboard squares adjacent to both the lateral axis of symmetry and the longitudinal axis of symmetry define four central chessboard squares within the battle zone, and wherein the chess game consequence further comprises at least one of (vii) restoration of a previously-captured chess piece, effected by placing a first restored chess piece on one of the four central chessboard squares, (viii) restoration of a previously-captured chess piece, except for any captured queen, effected by placing a second restored chess piece on one of the four central chessboard squares, and (ix) a grant of immunity for any restored chess piece for a predetermined number of ensuing moves by the another player.

* * * * *